(12) United States Patent
Akins et al.

(10) Patent No.: US 6,842,170 B1
(45) Date of Patent: Jan. 11, 2005

(54) DISPLAY WITH ALIGNED OPTICAL SHUTTER AND BACKLIGHT CELLS APPLICABLE FOR USE WITH A TOUCHSCREEN

(75) Inventors: Robert B. Akins, Palatine, IL (US); Ken Paitl, East Dundee, IL (US); George M. Ventouris, Lake Zurich, IL (US); Michael L. Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/271,634

(22) Filed: Mar. 17, 1999

(51) Int. Cl.⁷ .................................. G09G 5/00
(52) U.S. Cl. ..................... 345/173; 345/36; 178/18.01
(58) Field of Search ................. 345/173, 104, 345/36; 178/18.01, 18.1; 349/86

(56) References Cited

U.S. PATENT DOCUMENTS

| | | | |
|---|---|---|---|
| 4,238,793 A | | 12/1980 | Hochstrate |
| 4,545,648 A | * | 10/1985 | Shulman et al. ............ 349/114 |
| 5,004,323 A | | 4/1991 | West |
| 5,153,590 A | * | 10/1992 | Charlier ....................... 341/31 |
| 5,173,793 A | | 12/1992 | Purcell |
| 5,422,656 A | * | 6/1995 | Allard et al. ................ 345/173 |
| 5,525,867 A | | 6/1996 | Williams |
| 5,568,178 A | | 10/1996 | Hara et al. |
| 5,570,210 A | | 10/1996 | Yoshida et al. |
| 5,572,573 A | * | 11/1996 | Sylvan et al. .................. 379/61 |
| 5,592,193 A | | 1/1997 | Chen |
| 5,600,459 A | * | 2/1997 | Roy et al. ...................... 346/42 |
| 5,745,203 A | | 4/1998 | Valliath et al. |
| 5,784,136 A | | 7/1998 | Ando et al. |
| 5,870,156 A | | 2/1999 | Heembrock |
| 5,894,298 A | | 4/1999 | Hoeksma |
| 6,144,359 A | * | 11/2000 | Grave ......................... 345/102 |
| 6,188,379 B1 | * | 2/2001 | Kaneko ....................... 345/102 |
| 6,211,931 B1 | * | 4/2001 | Fukao et al. ................... 349/86 |

FOREIGN PATENT DOCUMENTS

| | | |
|---|---|---|
| CN | CN1062981 | 7/1992 |
| CN | CN2268702 Y | 11/1997 |
| DE | 19631700 | 8/1998 |
| EP | 0473878 | 5/1991 |
| JP | 03104432 | 5/1991 |
| WO | WO94/09474 | 4/1994 |
| WO | WO 94/09474 | 4/1994 |
| WO | WO98/08213 | 2/1998 |

* cited by examiner

*Primary Examiner*—Albert Decady
*Assistant Examiner*—Fritz Alphonse
(74) *Attorney, Agent, or Firm*—Sylvia Chen; Roland K. Bowler, II

(57) ABSTRACT

A display (200) with aligned optical shutter and backlight cells (239, 289) uses a patterned polymer-dispersed liquid crystal (PDLC) optical shutter material (230) and an electroluminescent (EL) backlight material (280) to provide a low-cost, low-current-drain display having good contrast in both bright-light and low-light conditions. The aligned, patterned optical shutter and backlight layers form pixel "windows" through which images printed on a background can be hidden or revealed. Specifically, a mask layer (250) bears the images and is inserted between the optical shutter and the backlight layers to show information images, cover inactive areas of the display, and cover electrode traces connecting active segments of the display. The display (200) is thin and flexible enough to be integrated with a touchscreen (290).

50 Claims, 5 Drawing Sheets

DISPLAY WITH ALIGNED OPTICAL SHUTTER AND BACKLIGHT CELLS APPLICABLE FOR USE WITH A TOUCHSCREEN

CROSS REFERENCE TO RELATED APPLICATIONS

This application is related to copending U.S. patent application Ser. No. 08/837,172 filed on Apr. 14, 1997 by Charlier et al. and entitled "Two-Way Communication Apparatus Having a Touchscreen-Based User Interface." The related application is assigned to the assignee of the present application and is hereby incorporated herein in its entirety by this reference thereto.

FIELD OF THE INVENTION

This invention relates generally to displays, and more particularly to an optical shutter-type display having a light source and applicable for use with a touchscreen.

BACKGROUND OF THE INVENTION

Certain portable electronic devices, such as radiotelephones, must be visible in both low-light and bright-light environments. A standard emissive display uses a pixelated, or patterned, light source in which different regions of the display can be selectively turned on to emit light. Regions of the display that are turned off do not emit light; however, in bright light situations, the "off" portion of the display can be as bright or brighter than the "on" portion of the display due to the highly reflective nature of the light-emitting materials (generally phosphors). A contrast filter, also called a neutral density filter, can be placed over the display and uses a partially light-absorbing film to absorb some of the emitted and reflected light from the display. The filter, however, reduces the brightness of the display in all viewing conditions.

Polymer-dispersed liquid crystal (PDLC) display technology is a low-cost, all-plastic display technology using micron-sized liquid crystal droplets dispersed in a solid polymer matrix. Dichroic dye molecules added to the liquid crystal droplets cause a PDLC display to exhibit the color of the dye when no electric field is applied to the display. In this colored state, the dye molecules and liquid crystal droplets are randomly arranged and the display is opaque. This is conceptually a "closed optical shutter" condition. When an electric field of predetermined strength and orientation is applied, the dye molecules and the liquid crystal droplets reorient to allow light to pass through the PDLC layer. This is conceptually an "open optical shutter" condition. In this transparent state, the display reveals the color of the display backing.

If the display backing is a reflective surface, in bright-light environments, ambient light makes two passes through the PDLC layer where the PDLC is in an open shutter condition. Optimizing the display for bright-light environments requires using a PDLC dye molecule concentration where the closed shutter state is dark yet without excess residual absorption in the open shutter state that would affect the display brightness. In low-light environments, a PDLC display can be backlit. When the display is backlit, however, the backlight only makes one pass through the PDLC display. When the PDLC dye molecule concentration is optimized for bright-light conditions, the backlit display has significantly degraded contrast and the "off" pixels can appear to be turned on.

Thus there is a need for a low-cost, low-current drain display that exhibits high contrast in both bright-light and low-light conditions.

DETAILED DESCRIPTION OF PREFERRED EMBODIMENTS

A display with aligned optical shutter and backlight cells uses a patterned polymer-dispersed liquid crystal (PDLC) optical shutter and a patterned electroluminescent (EL) backlight to provide a low-cost, low-current-drain display having good contrast in both bright-light and low-light conditions. The aligned, patterned optical shutter and backlight layers form pixel "windows" through which images printed on a background can be hidden or revealed. Specifically, a black mask bears the images and is inserted between the optical shutter and the backlight layers to show information images, cover inactive areas of the display, and cover electrode traces connecting active segments of the display.

The display with aligned optical shutter and backlight cells is thin and flexible enough to be integrated with a touchscreen. The display can be used to implement a keypad for a portable electronic device, such as a radiotelephone, by exhibiting the numbers and icons common to such user interfaces. Thus, under both bright light and low light conditions, a user could dial a telephone number by pressing the appropriate sections of the touchscreen, or enter phone-book information using handwriting recognition, or use the touchscreen for mouse operation.

Throughout this document, a pixel will refer to the smallest region in an optical shutter or a backlight, or an optical shutter aligned with a backlight, that can be individually controlled to turn on and turn off. A pixel can be controlled using direct drive or matrix addressing. A pixel need not be a contiguous area; it can be disjoint areas that are controlled together (e.g., both the dot and the line in a lower-case "i" can make up a single pixel).

Figure 1:
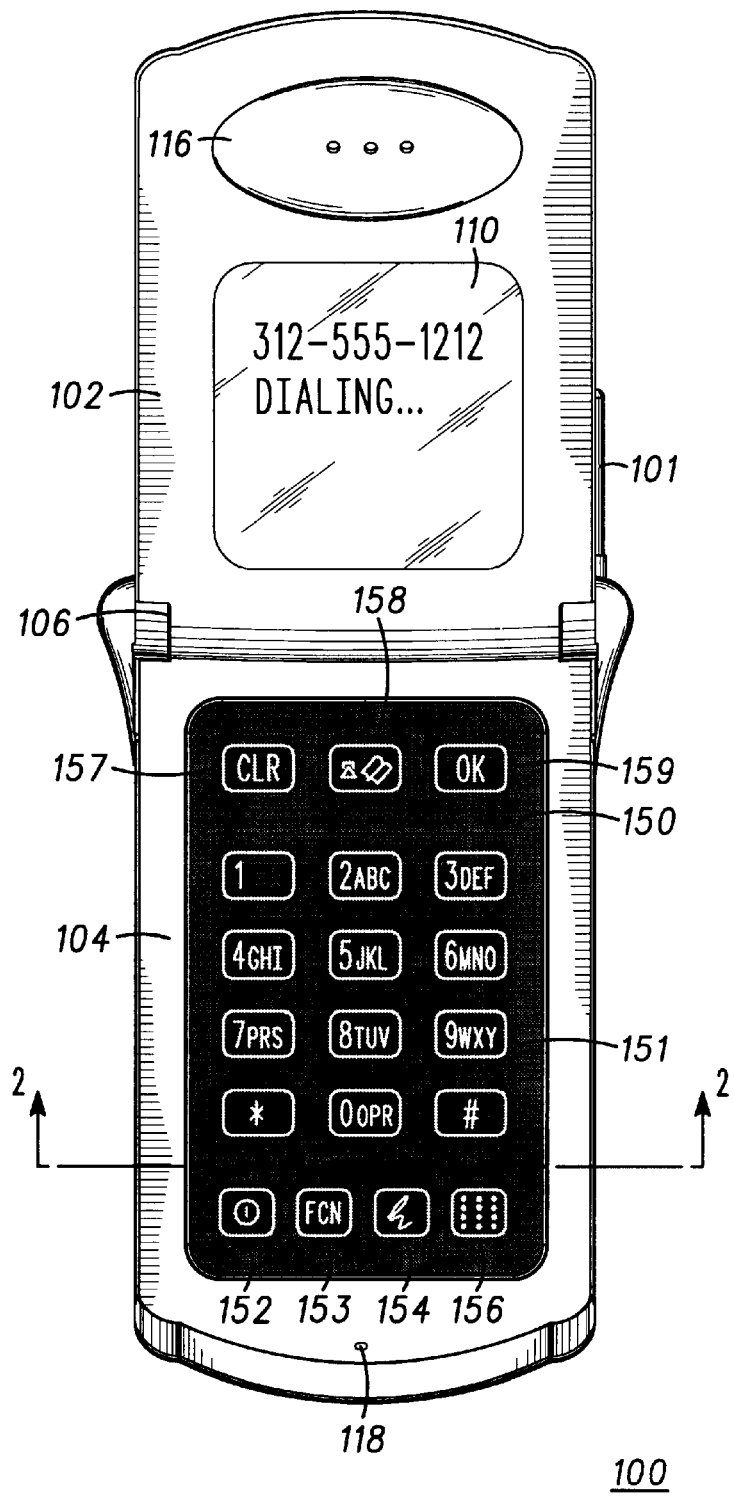
FIG. 1 shows an electronic device implementing a display with aligned optical shutter and backlight cells over a touchscreen according to a preferred embodiment.

FIG. 1 shows an electronic device 100 implementing a display with aligned optical shutter and backlight cells integrated with a touchscreen according to a preferred embodiment. The electronic device 100 shown is a radiotelephone, however, the display with aligned optical shutter and backlight cells can also be implemented in personal digital assistants, television remote controls, video cassette players, household appliances, automobile dashboards, billboards, point-of-sale displays, landline telephones, and other electronic devices.

The electronic device 100 has a first housing 102 and a second housing 104 movably connected by a hinge 106. The first housing 102 and the second housing 104 pivot between an open position and a closed position. An antenna 101 transmits and receives radio frequency signals for communicating with a complementary electronic device such as a cellular base station. A display 110 positioned on the first housing 102 can be used for functions such as displaying names, telephone numbers, transmitted and received information, user interface commands, scrolled menus, and other information. A microphone 118 receives sound for transmission, and an audio speaker 116 transmits audio signals to a user.

A keyless input device 150 is carried by the second housing 104. The keyless input device 150 is implemented as a touchscreen with a display. In the drawing, multiple images on the display are delineated with dashed lines. A main image 151 represents a standard, twelve-key telephone keypad. Along the bottom of the keyless input device 150, images 152, 153, 154, 156 represent an on/off button, a function button, a handwriting recognition mode button, and a telephone mode button. Along the top of the keyless input device 150, images 157, 158, 159 represent a "clear" button, a phonebook mode button, and an "OK" button. Additional or different images, buttons or icons representing modes, and command buttons can be implemented using the keyless input device. Each image 151, 152, 153, 154, 156, 157, 158, 159 is a direct driven pixel, and this keyless input device uses a display with aligned optical shutter and backlight cells to selectively reveal one or more images and provide contrast for the revealed images in both low-light and bright-light conditions.

Figure 2:
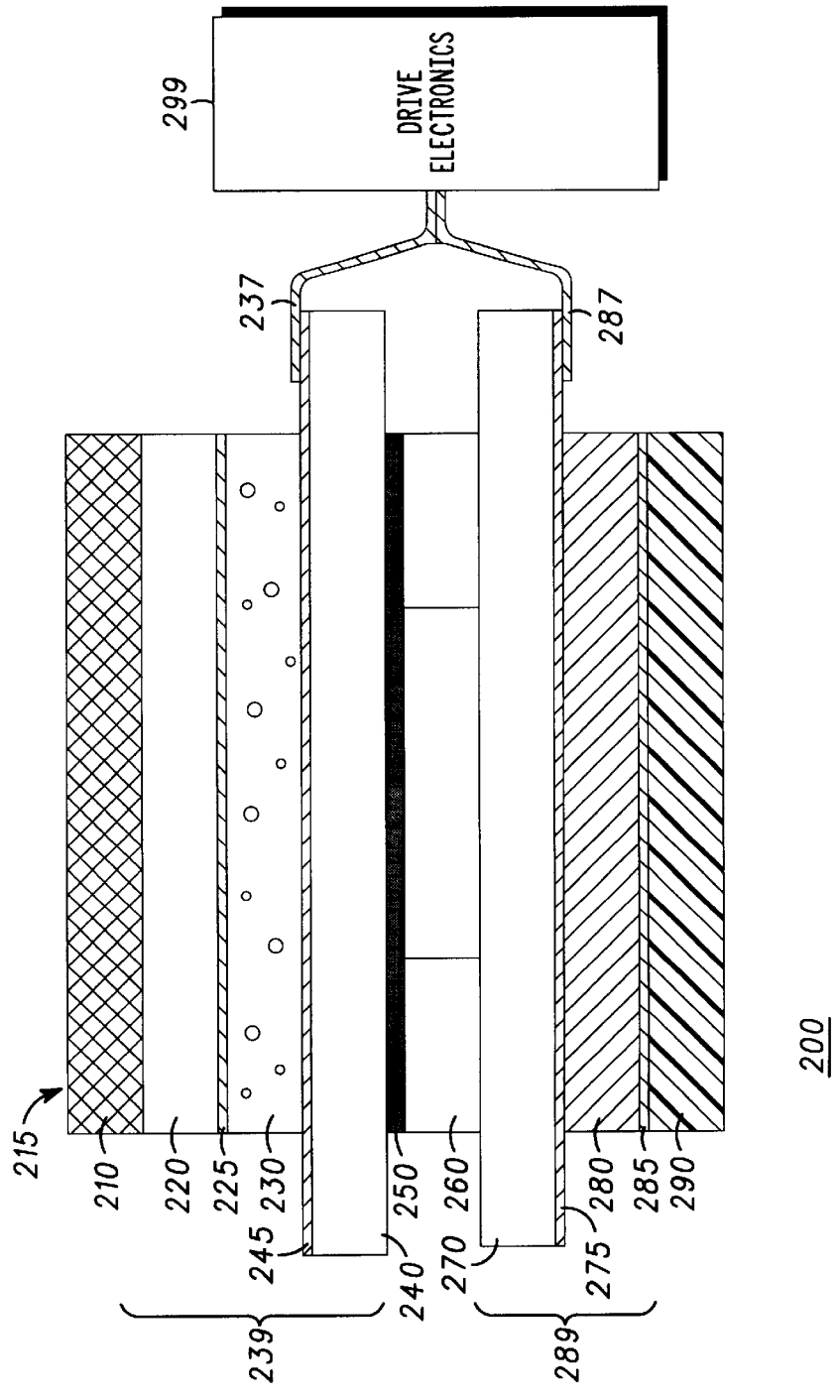
FIG. 2 shows a cross section of a display with aligned optical shutter and backlight cells over a touchscreen along line 2—2 of FIG. 1 according to a preferred embodiment.

FIG. 2 shows a cross section of a display 200 with aligned optical shutter and backlight cells over a touchscreen along line 2—2 of FIG. 1 according to a preferred embodiment. The preferred embodiment is a stack with multiple layers including an optical shutter cell 239, an optional mask layer 250, an optional color layer 260, a backlight cell 289, and an optional touchscreen 290.

A user 201 sees a top layer 210, which is an ultra-violet barrier with a matte upper surface 215 to reduce glare. Preferably, the top layer 210 is printed directly onto the top substrate 220 of the PDLC optical shutter cell 239. The PDLC optical shutter cell 239 is made from a PDLC optical shutter material 230 sandwiched between two electrodes 225, 245 and two substrates 220, 240. The electrodes and substrates are preferably transparent. The upper electrode 225 is preferably constructed using a solid indium-tin oxide (In$_2$O$_3$—SnO$_2$) (ITO) layer affixed to the substrate 220 adjacent to the PDLC optical shutter material 230. The lower electrode 245 is preferably constructed using a patterned ITO layer affixed to the lower substrate 240 adjacent to the PDLC optical shutter material 230. If desired, both electrodes 225, 245 can be patterned; however, the user 201 may see the patterning if it is implemented on the top electrode 225. One electrode 245 is connected to an external power supply via an optical shutter cell driver bus 237 to create an electric field of a predetermined strength while the other electrode 225 acts as a ground. The direction of the electric field is not important to the optical shutter, thus either electrode can act as the ground.

The electric field created by the electrodes 225, 245 alter the light transmission properties of the PDLC optical shutter material 230, and the pattern of the patterned electrode layer 245 defines pixels of the display. These pixels lay over the images 151, 152, 153, 154, 156, 157, 158, 159 of the keyless input device shown in FIG. 1. In the absence of the electric field, the liquid crystal material and dichroic dye in the PDLC material are randomly aligned and absorb most incident light. In the presence of the electric field, the liquid crystal material and dichroic dye align in the direction of the applied field and transmit substantial amounts of incident light. In this manner, a pixel of the PDLC cell can be switched from a relatively non-transparent state to a relatively transparent state. Each pixel can be independently controlled to be closed-shuttered or open-shuttered, depending on the application of an electric field.

A mask layer 250 bears images that include buttons for the keyless input device 150 shown in FIG. 1. Each button is underneath a pixel in the optical shutter cell 239. Note that more than one button can be underneath one pixel, and conversely one button can be underneath more than one pixel. The pixels act as "windows" with optical shutters that can be open or closed, to reveal an image 151, 152, 153, 154, 156, 157, 158, 159 shown in FIG. 1 borne by the mask. Because each pixel shown is only a simple window shape, and does not bear a complicated pattern, the patterned area in the patterned electrode 245 can be easily aligned with the mask layer 250. Preferably, the mask layer 250 is screen printed directly onto the bottom surface of the lower transparent substrate 240.

Underneath the mask layer 250 is a color layer 260 having one or more colors. In this preferred embodiment, color transflector blocks are aligned so that each image 151, 152, 153, 154, 156, 157, 158, 159 shown in FIG. 1 is a single color. A transflector has both transmission and reflection properties. The color layer 260 may alternatively be made of color filters, which only have transmission properties.

A backlight cell 289 includes a layer of backlight material 280 sandwiched between a transparent substrate 270 bearing a patterned ITO electrode 275 and a ground electrode 285. The patterned electrode 275 for the backlight cell 289 is aligned with and has the same pattern as the patterned electrode 245 for the optical shutter cell 239. In this preferred embodiment, the ground electrode 285 is a solid conductive ink layer printed directly onto the bottom surface of the backlight material 280; however, the ground electrode 285 may be patterned and may be borne on a transparent or non-transparent substrate if desired.

One electrode layer 275 is connected to an external power supply via a backlight cell driver bus 287 to create an electric field of a predetermined strength. Like the optical shutter, either electrode layer can act as the ground. Preferably, the voltage response and frequency drive requirements of the optical shutter cell 239 are similar to the backlight cell 289. Then, the backlight cell driver bus 287 and the optical shutter cell driver bus 237 can be connected to common drive electronics 299 for simultaneous control of pixels in the backlight cell and the optical shutter cell. Preferably, the optical shutter cell driver bus 237 is heat-sealed to the electrode 245, the backlight cell driver bus 287 is heat-sealed to the electrode 275, and both buses 237, 287 are heat-sealed together for connection to the drive electronics 299. Otherwise, pixels in the optical shutter cell 239 and the backlight cell 289 can be driven separately or mutually with different drive electronics.

Due to the all-plastic substrate construction, the display is thin and flexible enough to place over a touchscreen 290. The touchscreen 290 can be a resistance sensing system, a membrane switch, a force-sensing system such as a piezoelectric system, or be implemented using other types of technology.

Figure 3:
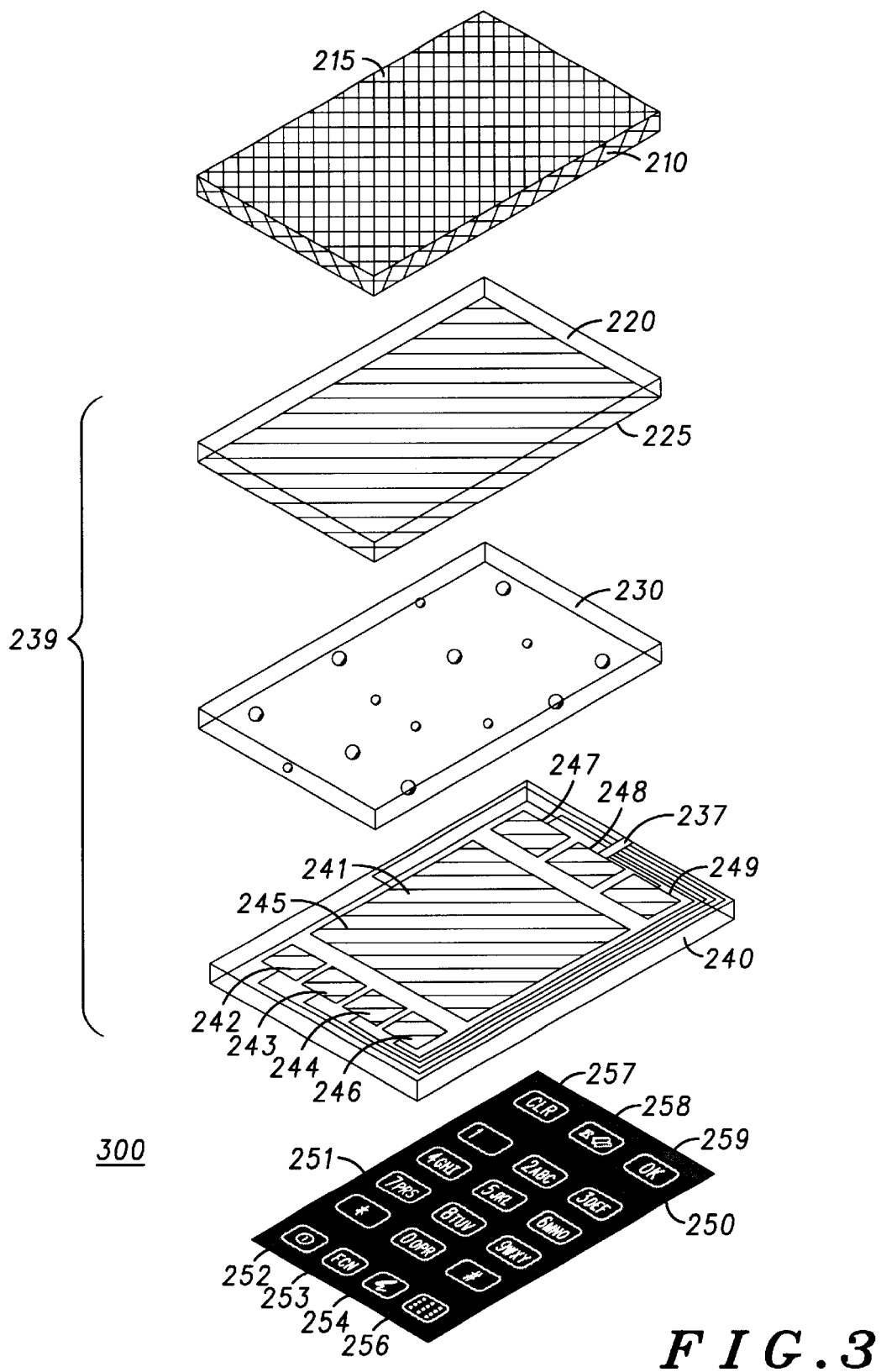
FIG. 3 shows an exploded view of the optical shutter cell side of the display shown in FIG. 2.

FIG. 3 shows an exploded view 300 of the optical shutter cell 239 side of the display shown in FIG. 2. In the preferred embodiment, the optical shutter cell 239 is implemented in the upper cross-sectional half of the display, and the pixels in the optical shutter cell 239 can be independently controlled to hide or reveal images in the mask layer 250. The optical shutter cell 239 can be implemented using any display technology that can be selectively addressed to change regions from a clear state to an absorbing state. Although the preferred embodiment uses PDLC technology for the optical shutter, an optical shutter layer can be made using nematic liquid crystal technology (such as twisted nematic or super twisted nematic liquid crystals), ferroelectric liquid crystal technology, electrically-controlled birefringent technology, optically-compensated bend mode technology, guest-host technology, and other types of light modulating techniques.

The top layer 210 with matte surface 215 lies above the transparent substrate 220 with the ground electrode 225 underneath. The ground electrode is implemented as a solid ITO layer. Next comes the optical shutter material 230 and another electrode 245 implemented as a patterned ITO layer. Finally, the mask layer 250 is affixed to the bottom of the transparent lower substrate 240.

The details of the electrodes 225, 245 for the optical shutter cell 239, and the mask layer 250, can be seen more clearly in this drawing. The mask layer 250 is an opaque mask bearing various images. A main image 251, representing the twelve keys of a standard telephone keypad, aligns underneath a main optical shutter pixel formed by a region 241 on the patterned ITO layer. Images 252, 253, 254, 256 along the bottom of the display align underneath regions 242, 243, 244, 246 respectively, and images 257, 258, 259 along the top of the display align underneath regions 247, 248, 249 respectively. Due to the large, window-like nature of the optical shutter pixels, the task of aligning the images on the mask with the appropriate pixels is not particularly exacting.

Each optical shutter pixel acts like an independent shutter for the image underneath the pixel. Thus, different images or combinations of images are shown on the display depending on which optical shutter pixels are open-shuttered and which optical shutter pixels are closed-shuttered. Note that the mask layer also somewhat conceals the traces between the regions 241, 242, 243, 244, 246, 247, 248, 249 in the patterned electrode 245 by creating a black background.

Figure 4:
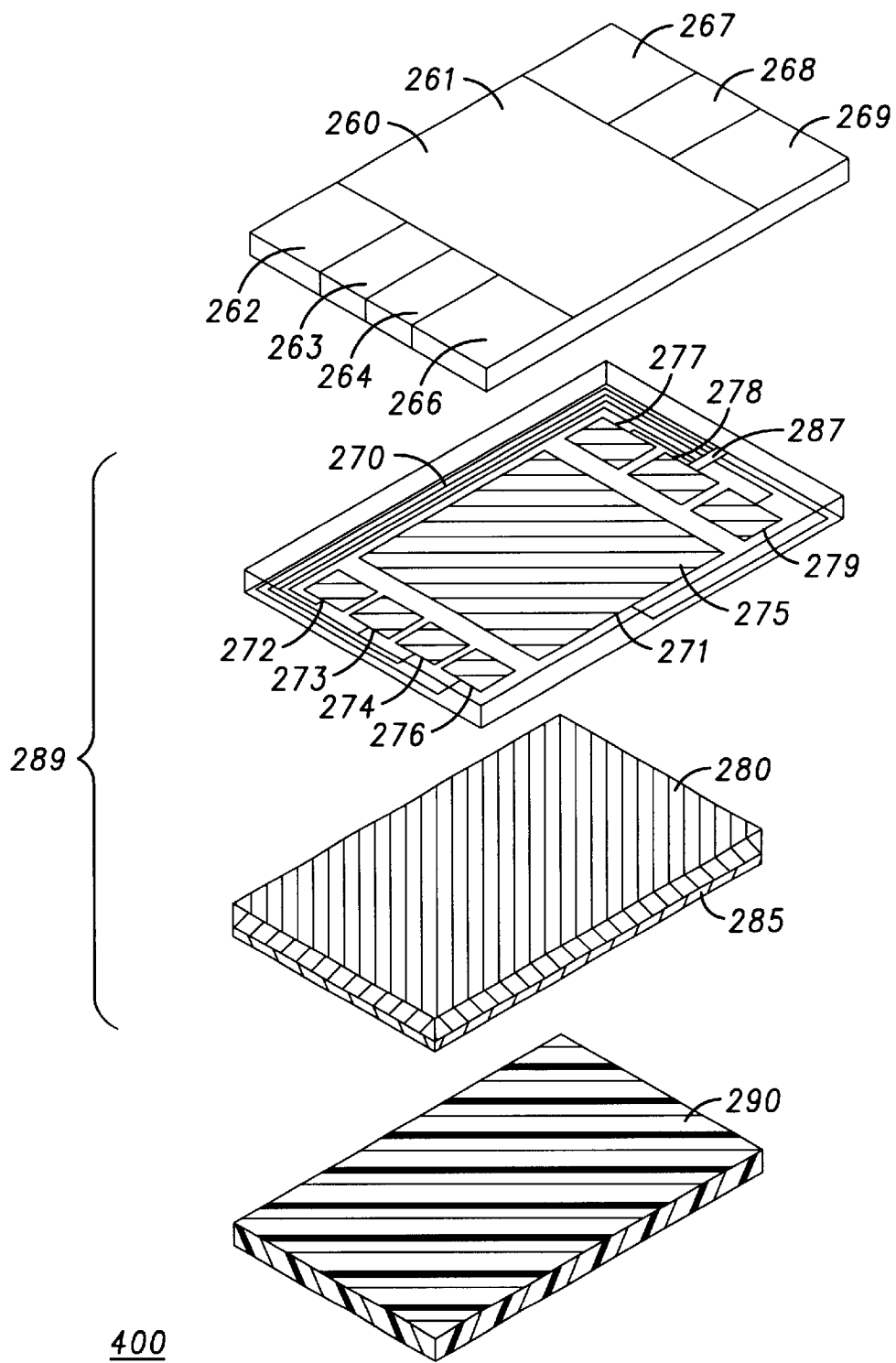
FIG. 4 shows an exploded view of the backlight cell side of the display shown in FIG. 2.

FIG. 4 shows an exploded view 400 of the backlight cell 289 side of the display shown in FIG. 2. In the preferred embodiment, the backlight cell 289 is implemented in the lower cross-sectional half of the display, and pixels in the backlight cell 289 can be independently controlled to backlight images in the mask layer 250. The backlight cell 289 can be implemented using any light source technology that can be selectively addressed to turn on and off. Aside from EL materials, a backlight layer can be made using a light emitting diode array, a plasma panel, a vacuum florescent panel, an edge-coupled light guide to a fluorescent tube, an organic or polymeric light emitting diode panel, or other light source materials.

The touchscreen 290 is underneath the ground electrode 285 of the backlight cell 289. Also in the backlight cell 289, above the backlight material 280, is a patterned electrode 275 borne by a transparent substrate 270. Above the transparent substrate 270 is a color layer 260.

The same pattern in the patterned electrode 245 for the optical shutter cell, shown most clearly in FIG. 3, is duplicated in the patterned electrode 275 for the backlight cell. The regions 271, 272, 273, 274, 276, 277, 278, 279 in the patterned electrode 275 match regions 241, 242, 243, 244, 246, 247, 248, 249 respectively in the pattered electrode 245 for the optical shutter cell 239. The patterned electrode 275 and ground electrode 285 interact to turn on selected backlight pixels to backlight selected images in the mask layer 250 shown in FIG. 2 and FIG. 3.

The color layer 260 is used to tint the backlight so that the images appear colored. For example, main area 261 is clear, area 262 is tinted green, areas 263, 264, 266 are tinted blue, and areas 267, 268, 269 are tinted orange. Again, due to the large, window-like backlight pixels, the alignment of the backlight pixels with the optical shutter pixels, the mask, and the color blocks is not difficult.

Figure 5:
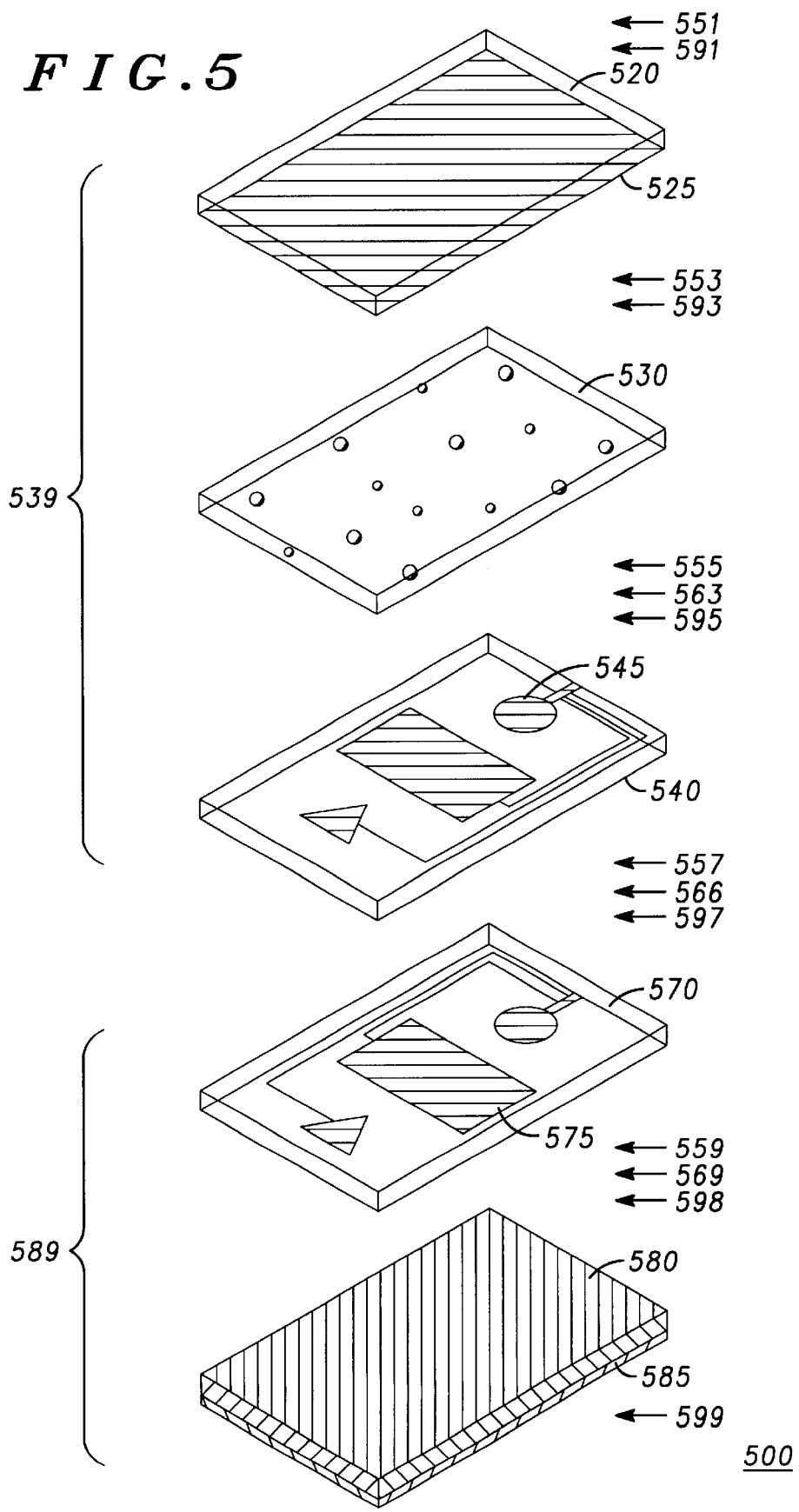
FIG. 5 shows various alternate embodiments of a display with aligned optical shutter and backlight cells applicable for use with a touchscreen.

FIG. 5 shows various alternate embodiments of a display 500 with aligned optical shutter and backlight cells. An optical shutter cell 539 of the display includes optical shutter material 530 sandwiched between two transparent substrates 520, 540 bearing electrodes 525, 545. Preferably, the upper electrode 525 is a solid ITO layer acting as a ground, and the lower electrode 545 is a patterned ITO layer for providing optical shutter pixels to reveal images. The pattern could be implemented in the upper electrode with the solid ground plane on the lower electrode or both electrodes could be patterned; however, the pattern on the upper electrode might be seen by the user under bright light conditions even when the display is off.

The backlight cell 589 includes a backlight material 580 sandwiched between a transparent substrate 570 having a first electrode 575 with the same ITO pattern as the patterned electrode 545 for the optical shutter cell, and a second electrode 585. This second electrode 585 preferably is a solid conductive ink layer printed directly onto the bottom of the backlight material 580 and acts as a ground. Again, the location of the second electrode and the patterned electrode can be reversed if desired, and the second electrode 585 can be patterned if desired.

If an image to be displayed is simple, no mask layer is needed to create the image. For example, no mask layer is needed to display a solid square, or a solid circle, or a solid triangle. If the image is more complicated, such as a word or more detailed icon, a mask layer, such as mask layer 250 shown in FIG. 2, can be included in the stack to create an image within the pixel. Arrows 551, 553, 555, 557, 559 indicate possible locations for mask layer placement. If placed in a location indicated by arrow 551, a user may still see the mask when the display is turned off. At the locations indicated by arrows 553, 555, the mask may create a non-uniform gap between the ITO substrates, leading to visual artifacts. Placing the mask as indicated by arrow 559 may create reflections between the optical shutter cell 539 and the backlight cell 589. Thus, the preferred placement of the mask is at arrow 557—over the backlight cell 589 but under the optical shutter cell 539.

A separate color transflector or color filter layer, such as color layer 260 shown in FIG. 2, can be used to add color and improve the reflective brightness of the display. Another way to provide color to the backlight is to use colored phosphors in the backlight cell. Depending on the reflectiveness and/or inherent color of the backlight layer, the transmission and reflection properties of the color layer 260 can be tuned to provide appropriate color and/or contrast in both bright-light and low-light conditions. Arrows 563, 566, 569 indicate possible locations for color layer placement. If a color layer is used in conjunction with a mask layer, the color layer should preferably be placed below the mask layer. Arrows 591, 593, 595, 597, 598, 599 indicate possible locations for a touchscreen layer such as touchscreen 290 shown in FIG. 2. If the touchscreen is clear, it can be located in any of the six possible locations. If the touchscreen is opaque (i.e., a touchpad), it can only be located at the location indicated by arrow 599.

The display with aligned optical shutter and backlight cells used with a touchscreen can be operable in a fixed-position mode of operation and a variable-position mode of operation. In a fixed-position mode of operation, the actual location of the user's finger determines the response of the electronic device. For example, when the telephone keypad image is displayed, pressing on the locations of displayed numbers determines the dialed telephone number. In a variable-position mode of operation, the relative movement of the user's finger determines the response of the electronic device. For example, in a handwriting recognition mode, the telephone keypad image is not displayed, and relative movements of the user's finger determines whether the electronic device interprets an input of the letter "A" or the letter "B." Another implementation of a variable-position mode of operation is a touchscreen used for mouse operation. Other modes of operation will be evident to those skilled in the art. Selecting between different modes of operation can be made by pressing on a mode button outside the main area of the display that is permanently in a fixed-position mode of operation.

If no color layer, mask layer, or touchscreen is located between the substrate 540 and the substrate 570, the two substrates 540, 570 can be combined into a single substrate.

Thus, a display with aligned optical shutter and backlight cells applicable for use with a touchscreen provides a high-contrast, low-cost, low-current-drain alternative to traditional displays. This display is particularly suited for application over a touchscreen to create a keyless input device. While specific components and functions of the display with aligned optical shutter and backlight cells applicable for use with a touchscreen are described above, fewer or additional components and functions could be employed by one skilled in the art within the true spirit and scope of the present invention. The invention should be limited only by the appended claims.

We claim:

1. An electronic device comprising:
   a housing carrying a keyless input device having:
   an optical shutter pixel;
   a backlight pixel aligned underneath the optical shutter pixel; and
   a touchscreen disposed beneath the backlight pixel.

2. An electronic device according to claim 1 wherein the keyless input device further comprises a mask layer located above the backlight pixel.

3. A radiotelephone comprising:
   an antenna;
   a housing coupled to the antenna;
   a keyless input device carried in the housing, having
   a top layer with an ultraviolet filter and a matte surface;
   an optical shutter cell, located underneath the top layer, having an optical shutter pixel;
   a mask layer, located underneath the optical shutter cell;
   a color layer, located underneath the mask layer;
   a backlight cell, located underneath the optical shutter cell, having a backlight pixel aligned with the optical shutter pixel; and
   a touchscreen, located underneath the top layer.

4. A display comprising:
   a polymer-dispersed liquid crystal optical shutter cell having a plurality of optical shutter pixels;
   an electroluminescent backlight cell with a plurality of backlight pixels, aligned underneath the plurality of optical shutter pixels;
   at least one driver for controlling a transition of the plurality of optical shutter pixels between first and second states and a transition of the plurality of backlight pixels between first and second states; and
   a touchscreen layer.

5. A display according to claim 4, the at least one driver is a matrix drive driver for matrix controlling transition of the plurality of optical shutter pixels and transition of the plurality of backlight pixels.

6. A display according to claim 4, a mask layer located below the polymer-dispersed liquid crystal optical shutter cell.

7. A display according to claim 4, a color layer located above the backlight cell.

8. A display according to claim 7, wherein the color layer comprises a transflector.

9. A display according to claim 7, wherein the color layer comprises a filter.

10. A display according to claim 9 wherein the top layer has a matte upper surface.

11. A display according to claim 4, a top layer, located above at least a portion of the optical shutter cell, having an ultraviolet barrier.

12. A display according to claim 4, the at least one driver is a single driver for simultaneously controlling transition of the plurality of optical shutter pixels and transition of the plurality of backlight pixels.

13. A display according to claim 4, the touchscreen layer is located underneath the backlight cell.

14. A display according to claim 4, the polymer-dispersed liquid crystal material located between corresponding first and second electrodes, one of which has a pixel pattern, the electroluminescent material located between corresponding first and second electrodes, one of which has the same pixel pattern as the patterned electrode of the polymer-dispersed liquid crystal material.

15. A display comprising:
   an optical shutter layer having a cell disposed between optical shutter electrodes, one of the optical shutter electrodes having an optical shutter cell pattern defining optical shutter pixels;
   a backlight layer having a cell disposed between backlight electrodes, one of the backlight electrodes having substantially the same pattern as the shutter electrode,
   the backlight cell disposed underneath the optical shutter cell, the patterned optical shutter electrode aligned with the patterned backlight electrode;
   a driver coupled to optical shutter layer and the backlight layer.

16. A display according to claim 15, the optical shutter cell comprises a polymer-dispersed liquid crystal material.

17. A display according to claim 16, the backlight cell comprises an electroluminescent material.

18. A display according to claim 15, a touchscreen layer disposed below the backlight layer.

19. A display according to claim 15, an information image mask layer located below the optical shutter cell.

20. A display according to claim 15, the driver is a single driver for simultaneously controlling the transition of the optical shutter pixels and the backlight pixels.

21. The display of claim 15, a transflector layer disposed between the optical shutter layer and the backlight layer, the transflector layer transmitting light from the backlight layer side thereof to the optical shutter layer and reflecting light from the optical shutter side thereof.

22. An electronic device comprising:
an optical shutter layer having a plurality of display pixels;
a backlight layer having a plurality of backlight pixels;
each of the plurality of display pixels aligned with not more than a single one of the plurality of backlight pixels.

23. The device of claim 22,
each of the plurality of display pixels having first and second states;
each of the plurality of backlight pixels having first and second states;
a driver coupled to the plurality of backlight pixels and to the plurality of display pixels for simultaneously driving corresponding aligned display and backlight pixels between first and second states.

24. The device of claim 23,
at least some of the display pixels having different shapes, each backlight pixel having the same shape as the corresponding display pixel with which the backlight pixel is aligned,
the first state of the optical shutter layer is a light transmitting state and the second state of the optical shutter layer is a non-transmitting state, the first state of the backlight layer is an illuminated state and the second state of the backlight layer is a non-illuminated state.

25. The device of claim 22, a reflective and transmissive layer disposed between the optical shutter layer and the backlight layer.

26. The device of claim 22, an image-bearing mask disposed between the backlight layer and the optical shutter layer.

27. The device of claim 22, the display layer is a polymer-dispersed liquid crystal material, the backlight layer is an electroluminescent material.

28. The device of claim a 22, a touchpad disposed underneath the backlight layer, the backlight layer disposed between the optical shutter layer and the touchpad.

29. An electronic device comprising:
an optical shutter layer having a plurality of shutter pixels;
a backlight layer having a plurality of backlight pixels disposed beneath and aligned with shutter pixels of the optical shutter layer,
a transflector layer disposed between the backlight layer and the optical shutter layer,
the transflector layer reflecting light from an optical shutter layer side thereof and transmitting light from a backlight layer side thereof
an image-bearing mask disposed between the backlight layer and the optical shutter layer.

30. The device of claim 29, the backlight layer having a plurality of backlight pixels, each of the plurality of backlight pixels aligned with a corresponding one of the plurality of shutter pixels.

31. The device of claim 29, the optical shutter layer includes a polymer-dispersed liquid crystal material, the backlight layer includes an electroluminescent material.

32. The device of claim 29, an image of the imaging-bearing mask aligned with corresponding optical shutter pixels.

33. The device of claim 32, the backlight layer having a plurality of backlight pixels, each of the plurality of back-light pixels aligned with a corresponding one of the plurality of shutter pixels.

34. The device of claim 33,
at least some of the shutter pixels having different shapes, each backlight pixel having the same shape as the corresponding shutter pixel with which the backlight pixel is aligned,
a driver coupled to the backlight pixels and to the shutter pixels for simultaneously driving corresponding aligned shutter pixels and backlight pixels between first and second states.

35. The device of claim 34, a touchpad disposed underneath the backlight layer, the backlight layer between the touchpad and the optical shutter layer, the backlight layer disposed between the touchpad and the optical shutter layer.

36. The device of claim 29, a touchpad disposed underneath the backlight layer, the backlight layer between the touchpad and the optical shutter layer, the backlight layer disposed between the touchpad and the optical shutter layer.

37. An electronic device comprising:
a display layer having a plurality of display pixels;
a backlight layer disposed beneath the display layer,
the backlight layer having a plurality of backlight pixels, each of the plurality of backlight pixels aligned with a corresponding one of the plurality of display pixels;
an image-bearing mask disposed between the backlight layer and the display layer.

38. The device of claim 37, an image of the image-bearing mask aligned with corresponding display pixels.

39. The device of claim 37, the display layer is an optical shutter layer, the display pixels are shutter pixels.

40. The device of claim 39, a driver coupled to the backlight pixels and to the shutter pixels for simultaneously driving corresponding aligned shutter and backlight pixels between first and second states.

41. The device of claim 39, a transflector layer disposed between the backlight layer and the optical shutter layer.

42. The device of claim 39, the display layer includes a polymer-dispersed liquid crystal material, the display pixels having a light transmitting state and another state.

43. The device of claim 42, a transflector layer disposed between the display layer and the backlight layer, the transflector layer transmitting light from the backlight layer side thereof to the display layer where the display pixels are in a light transmitting state.

44. The device of claim 37, a touchpad disposed underneath the backlight layer, the backlight layer disposed between the touchpad and the display layer.

45. An electronic device comprising:
an optical shutter layer having a plurality of shutter pixels, at least some of the shutter pixels having different shapes;
a backlight layer having a plurality of backlight pixels, each of the shutter pixels aligned with at least one corresponding backlight pixel,
the at least one backlight pixel having the same shape as the corresponding shutter pixel with which the at least one backlight pixel is aligned.

46. The device of claim 45, not more than one backlight pixel aligned with a corresponding one of the shutter pixels, each backlight pixel and corresponding shutter pixel aligned therewith having substantially the same shape.

47. The device of claim 45, a driver coupled to the plurality of backlight pixels and to the plurality of shutter pixels, the driver simultaneously controlling corresponding aligned shutter pixels and backlight pixels.

48. The device of claim 45, a touchscreen disposed below the backlight layer.

49. The device of claim 45, a reflective and transmissive layer disposed between the optical shutter layer and the backlight layer.

50. The device of claim 45, an image-bearing mask disposed between the backlight layer and the optical shutter layer.

* * * * *